United States Patent [19]

Bellomo

[11] 4,000,629
[45] Jan. 4, 1977

[54] HOMOKINETIC JOINT
[76] Inventor: Andrea Bellomo, Str. S.Anna 82/6, Torino, Italy, 10131
[22] Filed: July 11, 1975
[21] Appl. No.: 595,012
[52] U.S. Cl. .................... 64/21; 64/7; 64/8
[51] Int. Cl.² .......................... F16D 3/30
[58] Field of Search .................... 64/21, 8, 7

[56] References Cited
UNITED STATES PATENTS

| 2,150,952 | 3/1939 | Ward | 64/21 |
| 2,432,803 | 12/1947 | Rice | 64/21 |
| 3,106,077 | 10/1963 | Sharp | 64/21 |

*Primary Examiner*—Samuel Scott
*Assistant Examiner*—Randall Heald
*Attorney, Agent, or Firm*—James D. Halsey, Jr.; H. J. Staas

[57] ABSTRACT

A constant velocity universal or universal and sliding joint includes an inner element, an outer element and an even number of balls engaged by opposite and crossing grooves formed on the two elements.

The axial sliding of one element with respect to the other is prevented or limited at the ends of the slip by means of the mating contact of two spherical surfaces formed or put on the ends of the inner element with two spherical surfaces formed on cups fixed to the ends of the outer element.

5 Claims, 3 Drawing Figures

HOMOKINETIC JOINT

DETAILED DESCRIPTION OF THE INVENTION

This invention provides improvement to homokinetic universal or universal and sliding joints of the type made up of an inner element, or hub, connected to a shaft, of an outer element, or ring, connected to the other shaft and of an even number of driving balls, each of them being engaged and guided, without the aid of a cage or other similar devices, by two opposite crossing grooves, one formed on the outer surface of the hub and the other on the inner surface of the ring. The said grooves cross each other symmetrically on the bisector plane of the axes of the shafts connected by the joint.

In the joints of this type, one half of the balls transmits the torque in one direction and the other half in the opposite direction.

The object of this invention is to limit or prevent the axial movement of the hub with respect to the ring.

The prior art proposes to limit the said movement by shaping the ends of the hub by two spherical rims or portions of spherical rims and narrowing the ends of the inner surface of the ring by two spherical rims or portions of spherical rims so that the axial movement of the hub with respect to the ring is limited by the contact of each spherical rim of the hub with the corresponding spherical rim of the ring. This construction, however, has mating contact surfaces at small angles with respect to the axis of each element with consequent wedging due to the axial thrust.

The object of the present invention is to prevent this wedging by fixing at the ends of the ring two cups, on each of the two a portion of spherical surface is formed, the corresponding portion of the spherical surface formed or put on each end of the hub, obtaining a more frontal stop at the ends of the slip.

The invention is described, as an example, with reference to the FIGS. 1 to 3 of the enclosed table:

Figure 1:
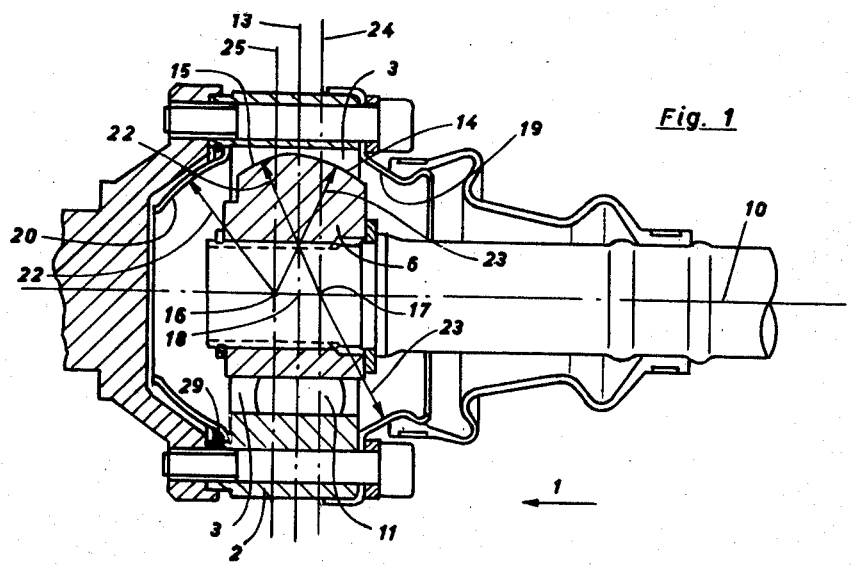
FIG. 1 is an axial section of a six ball joint capable of angular shifting and axial sliding.
Figure 2:
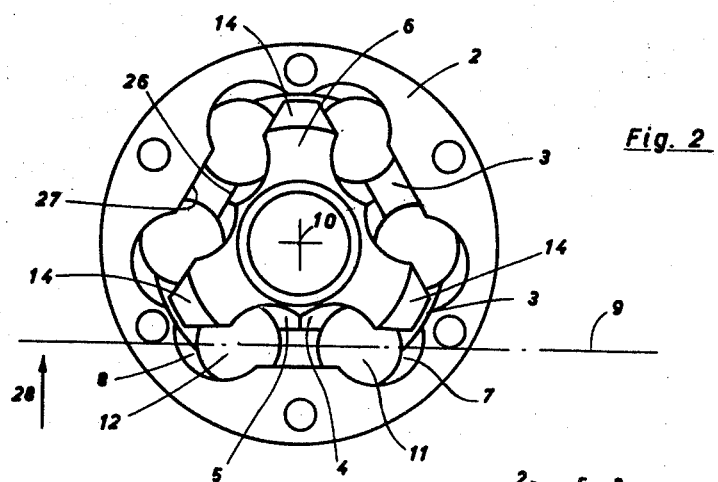
FIG. 2 is a view, in direction of the arrow 1, of the joint of FIG. 1, with removed covers, screws and shafts.

In these figures, according to known constructions, the outer surface of the hub 6 and the inner surface of the ring 2 have prismatic shape with triangular cross section with opposite faces, such as 26 and 27, on each of which two straight grooves, with circular cross section, are formed. The geometrical axes of the two adjacent grooves 4 and 5 of the hub and the geometrical axes of the corresponding grooves 7 and 8 of the ring lie on a plane 9 parallel to the axis 10 of the aligned shafts and parallel to the opposite faces 26 and 27 of the hub and of the ring. The grooves 4 and 5 of the hub converge in one axial direction and the corresponding grooves 7 and 8 of the ring converge in the axially opposite direction. The grooves 4 and 5 of the hub can also be parallel and in this case also the corresponding grooves 7 and 8 of the ring must be parallel with equal but opposite inclination.

All the centers of the balls, such as 11 and 12, engaged by the described grooves, lie, in their mean working position, on the plane 13 of FIG. 1 right angled with the axis 10 of the aligned shafts. A space 3 all around between the two elements of the joint allows the relative angular shifting and axial sliding of the two elements.

According to the present invention, the outer surface of the hub 6 is formed by two spherical rims 14 and 15 having their spherical centers respectively in 16 and 17 on the axis of the hub, symmetrically with respect to the mean working center 18, each being spaced towards the opposite spherical rim. Since the cross section of the hub is of triangular shape, each of these spherical rims is limited to three portions at the vertex of the triangle, these portions being also cut by the grooves engaging the driving balls. On the cup, fixed at one end of the ring 2, a spherical rim 19, with center 17 and radius 23, equal to the corresponding radius 23 of the hub, is formed. On the cup retained at the other end of the ring 2, by the circlip 29, a spherical rim 20, with spherical center in 16 and radius 22 equal to the corresponding radius 22 of the hub, is formed. The radius 22 and the radius 23 are not generally equal.

The spherical centers 16 and 17 of the cups are on the axis 10 of the ring symmetrically located with respect to the mean working center 18 and each is spaced towards the respective cup; therefore the center 17 of the spherical rim 19 of a cup is coincident with the center of the spherical rim 15 of the hub 6 and the center 16 of the spherical rim 20 of the other cup is coincident with the center of the spherical rim 14 of the hub 6 when the joint is in the mean working position and the axes of the elements 2 and 6 coincide with the axis 10. The axial sliding of the hub is limited at one end by the mating contact of the spherical rim 14 with the spherical rim 19 of one cup and in this case the spherical center 16 of the hub coincides with the spherical center 17 of the cup and the plane of the centers of the balls moves into the position 24 containing the common center of the mating rims.

At the other end similarly the rim 15 of the hub contacts the rim 20 of the other cup and the plane of the centers of the balls moves into the position 25 containing the common center of the mating rims.

Figure 3:
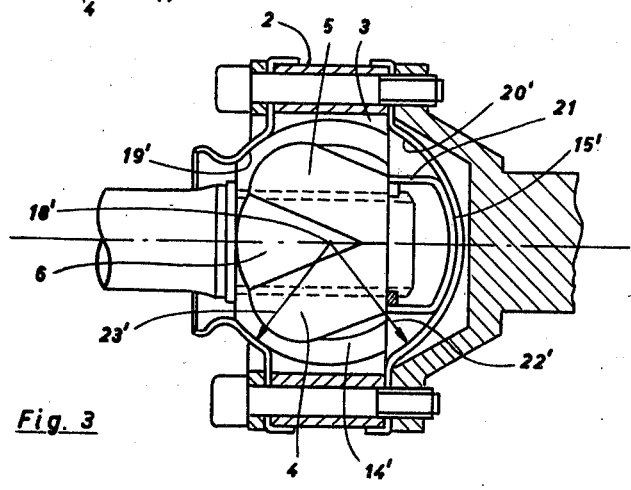
FIG. 3 is an axial section of a joint capable only of angular shifting with the inner element shown by a view in direction of the arrow 28 of FIG. 2.

FIG. 3 shows, as a variant, a joint capable only of angular shifting. Only one spherical surface 14' with radius 23' and center in 18', pivot center of the joint, is formed on the hub 6, and one of the cups connected to the ring 2 is formed with the shape of a spherical surface 19' mating the spherical surface 14' of the hub. A spherical surface 20', with center in 18' and radius 22' higher than the radius 23' of the hub, so that it allows the angular movement of the hub itself, is formed on the other cup. A bottom 21 with spherical surface 15' mating the spherical surface 20' of the said cup is put between the hub 6 and the cup itself in order to prevent the axial sliding of the hub 6 with respect to the ring 2.

Of course the spherical surfaces 19' and 20' of the cups and the spherical surfaces 14' of the hub 6 and 15' of the bottom 21 could have two different centers, in the way shown by FIG. 1, in order to realize a joint capable of angular shifting and axial sliding.

Separately from the described figures, the present invention relates to joints with any shape of the hub and of the ring and with any geometry of the grooves, straight or curved and however shaped in the cross section.

I claim:

1. A homokinetic universal joint comprising an inner element, an outer element and an even number of driving balls, each ball being engaged and guided solely by two opposite grooves symmetrically crossing on the bisector plane of the angle between the axes of the shafts connected by the joint, one groove formed on the inner element and the other groove on the outer element, characterized by the fact that portions of two spherical surfaces (14, 15) are formed on the ends of the inner element with their spherical centers (16, 17) on the axis of the inner element, each spaced towards the opposite spherical surface, and two cups are connected to the ends of the outer element, portions of two spherical surfaces (19, 20) being formed on the said cups with their spherical centers (17, 16) on the axis of the outer element, each spaced towards the respective cup, the axial relative sliding of the two elements being limited by the contact and the mating of the said spherical surfaces formed on the inner element with the said spherical surfaces formed on the cups connected to the outer element.

2. A homokinetic universal joint comprising an inner element, an outer element and an even number of driving balls, each ball being engaged and guided solely by two opposite grooves symmetrically crossing on the bisector plane of the angle between the axes of the shafts connected by the joint, one groove formed on the inner element and the other groove on the outer element, characterized by the fact that a portion of a spherical surface (14') is formed on the inner element, a portion of a second spherical surface (15') is formed on a bottom (21) part on one end of the inner element wherein their spherical centers are on the axis of the inner element, and two cups are connected to the ends of the outer element, two spherical surfaces (19', 20') being partly formed on the said cups with their spherical centers on the axis of the outer element, the axial relative sliding of the two elements being limited by the contact and the mating of said spherical surfaces of the inner element with the said spherical surfaces of the outer element.

3. A universal joint comprising:
first means for rotation about a first axis;
second means for rotation about a second axis;
said first means forming an outer portion of said universal joint and said second means forming an inner portion of said universal joint;
means for transmitting torque between said first and second rotating means;
said first means having a hollow portion with spherical cup shaped surfaces internal to said hollow portion for limiting relative sliding movement between said first and second rotating means;
said second means having a spherical hub portion symmetric with said second axis, located within said hollow portion of said first rotating means;
said first means having an even number of grooves within said hollow portion, located evenly around said first axis and each groove lying in a separate plane parallel to said first axis;
said second means having an even number of grooves on the surface of said spherical hub portion located evenly around said second axis and each groove lying in a separate plane parallel to said second axis, wherein each groove on the surface of said spherical hub portion, corresponds to a groove within said hollow portion of said first rotating means;
said torque transmitting means consisting of a spherical ball located within each set of corresponding grooves of said first and second rotating means.

4. A universal joint as in claim 3, wherein said first axis and said second axis form a variable angle and define a bisector plane of said angle, and said corresponding grooves cross with respect to each other on said bisector plane.

5. A universal joint as in claim 4, wherein said hollow portion of said first rotating means defines an opening and said second rotating means includes a shaft portion connected to said spherical hub portion and extends through said opening;
one of said spherical cup shaped surfaces surrounds said opening and limits said relative sliding motion of said second rotating means with respect to said first rotating means in a direction extending from said hollow portion through said opening;
a second of said spherical cup shaped surfaces located co-axial with said first axis opposite said opening in said hollow portion for limiting said relative sliding movement between said second rotating means and said first rotating means in a direction extending from said opening into said hollow portion.

* * * * *